(12) United States Patent
Dunning et al.

(10) Patent No.: US 6,917,659 B1
(45) Date of Patent: Jul. 12, 2005

(54) METHOD AND APPARATUS FOR RECEIVING DATA

(75) Inventors: David S. Dunning, Portland, OR (US); Chamath Abhayagunawardhana, Portland, OR (US); Kenneth Drottar, Portland, OR (US); Richard S. Jensen, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 803 days.

(21) Appl. No.: 09/749,269

(22) Filed: Dec. 27, 2000

(51) Int. Cl.⁷ .............................................. H04L 7/00
(52) U.S. Cl. ...................... 375/360; 375/326; 375/373; 370/518
(58) Field of Search ................................ 375/326, 360, 375/371, 373; 370/516, 518; 327/144, 151, 160

(56) References Cited

U.S. PATENT DOCUMENTS

| | | | | |
|---|---|---|---|---|
| 5,623,522 A | * | 4/1997 | Ito | 375/369 |
| 6,081,561 A | * | 6/2000 | Julyan et al. | 375/340 |
| 6,359,946 B1 | * | 3/2002 | Ryan | 375/371 |

\* cited by examiner

*Primary Examiner*—Young T. Tse
(74) *Attorney, Agent, or Firm*—Blakely, Sokoloff, Taylor & Zafman LLP (57) ABSTRACT

A method of recovering data from a modulated data signal includes tracking a transmitted clock with a plurality of locally-generated clock phases, estimating an average phase of previously detected edges, registering a pulse edge in the received stream of data at a transition phase corresponding to one of the plurality of locally-generated clock phases, determining whether a first symbol was received multiple times consecutively prior to the registered pulse edge, and using the determination of whether the first symbol was received multiple times consecutively in a receiver decision process.

26 Claims, 7 Drawing Sheets

FIG. 7

METHOD AND APPARATUS FOR RECEIVING DATA

FIELD OF THE INVENTION

The invention relates generally to methods and apparatuses for receiving data, and more particularly to a method and apparatus for receiving data over a noisy channel, such as that over which servers communicate.

BACKGROUND OF THE INVENTION

In serial data communication, the channel through which information is transmitted imposes a limit on the bandwidth capacity, or rate at which information may pass through the channel. One significant limitation on achievable bandwidth is known as inter-symbol interference, which occurs when a portion of a signal representative of one bit of information interferes with a different portion of the signal representative of a different bit of information. While the portions of the signal corresponding to respective bits are transmitted such that they occur at different times (i.e., within respective bit periods), efforts to exploit more and more of a media's theoretical available bandwidth results in a concomitant increase in the likelihood that a transmitted pulse will be "chirped" or spread, at lower power, over consecutive bit periods before reaching the receiver.

Besides attenuating the maximum energy contained in any one-bit period, the affected pulses interfere with adjacent bits. Since adjacent bits may not be correlated consistently, the interfering bits or pulses have a direct and substantial impact on the effective noise power and thus reduces the signal to noise ratio.

While it is known to employ equalization in the receiver using analog circuitry, such techniques are generally considered to be too complex and or expensive for applications involving transmission at higher bit rates.

The invention is therefore directed to the problem of developing a system and method capable of extending the benefits of equalization to higher bit rate transmission.

DETAILED DESCRIPTION

The invention solves these and other problems by a method and apparatus for providing equalization for a communication channel which avoids the complexity and additional components required by prior art equalization techniques. By avoiding such complexity, the invention supports high data rates.

It is worthy to note that any reference herein to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment In accordance with an illustrative embodiment of the invention, edge transition samples, along with a history of data transmitted over the communication channel, are monitored and given weight in a determination on the amount of equalization to be applied.

A method of recovering data from a modulated data signal in accordance with an illustrative embodiment of the invention includes tracking a transmitted clock with a plurality of locally-generated clock phases, estimating an average phase of previously detected edges, registering a pulse edge in the received stream of data at a transition phase corresponding to one of the plurality of locally- generated clock phases, determining whether a first symbol was received multiple times consecutively prior to the registered pulse edge, and using the determination of whether the first symbol was received multiple times consecutively to determine whether to assign a registered pulse edge to a current or subsequent bit period.

System Overview

Figure 1:
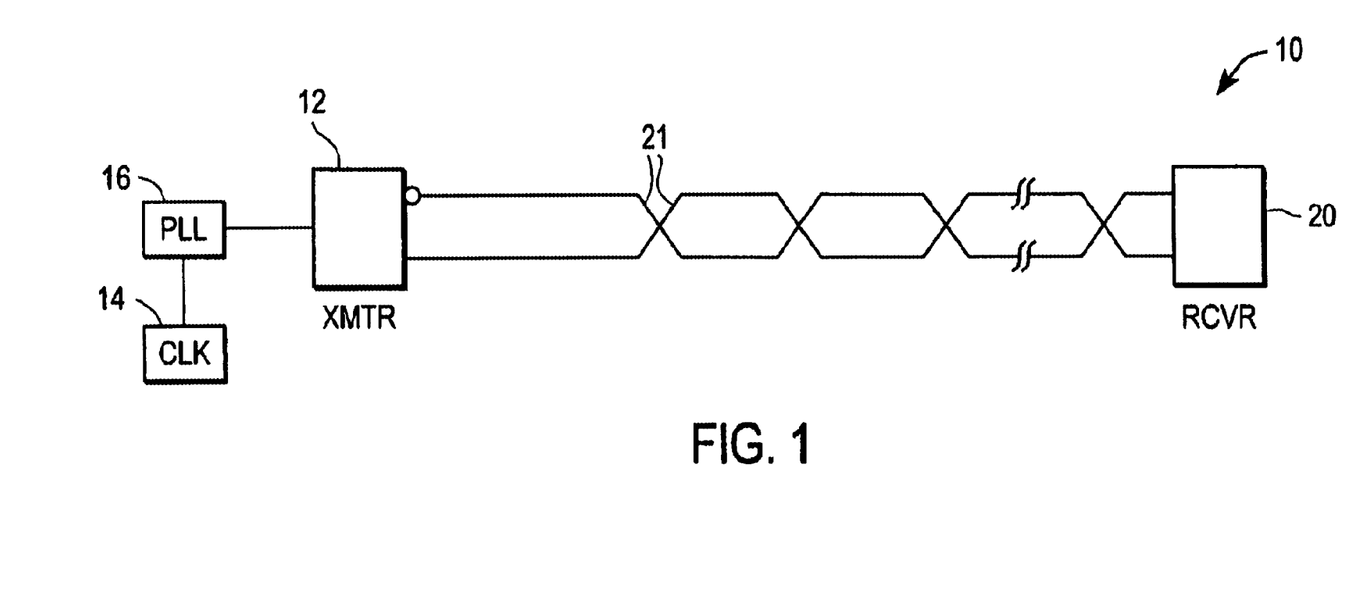
FIG. 1 illustrates a block diagram of an illustrative high-speed data transmission system implementing digital equalization according to the invention.

FIG. 1 is a block diagram of an exemplary embodiment of a high-speed communications system 10 according to one aspect of the invention. The high-speed communication system 10 of the illustrative embodiment includes a transmitter 12 for producing a differentially encoded signal. To this end, the transmitter contains a multiple phase reference clock 14 operatively associated with a phase locked loop (PLL) 16 for generating a plurality of clock phases synchronized with reference clock 14. Illustrative system 10 further includes a receiver 20, which is coupled to the transmitter via a suitable media 21, which defines a data channel.

One possible use for the exemplary high-speed communication system 10 includes communications between servers, which are interconnected via a bus or network. These servers need to transmit data at extremely high speeds and with few data errors. Consequently, the edge-based receiver of the invention can be used to further improve the data rate of such inter-server communications.

An exemplary embodiment of a computer system according to one aspect of the invention includes several modular components communicating with each other. Each of the modular components includes a transmitter and receiver, or alternatively, a transceiver. The transmitter transmits a modulated data signal that is subsequently received by the receiver.

Figure 6:
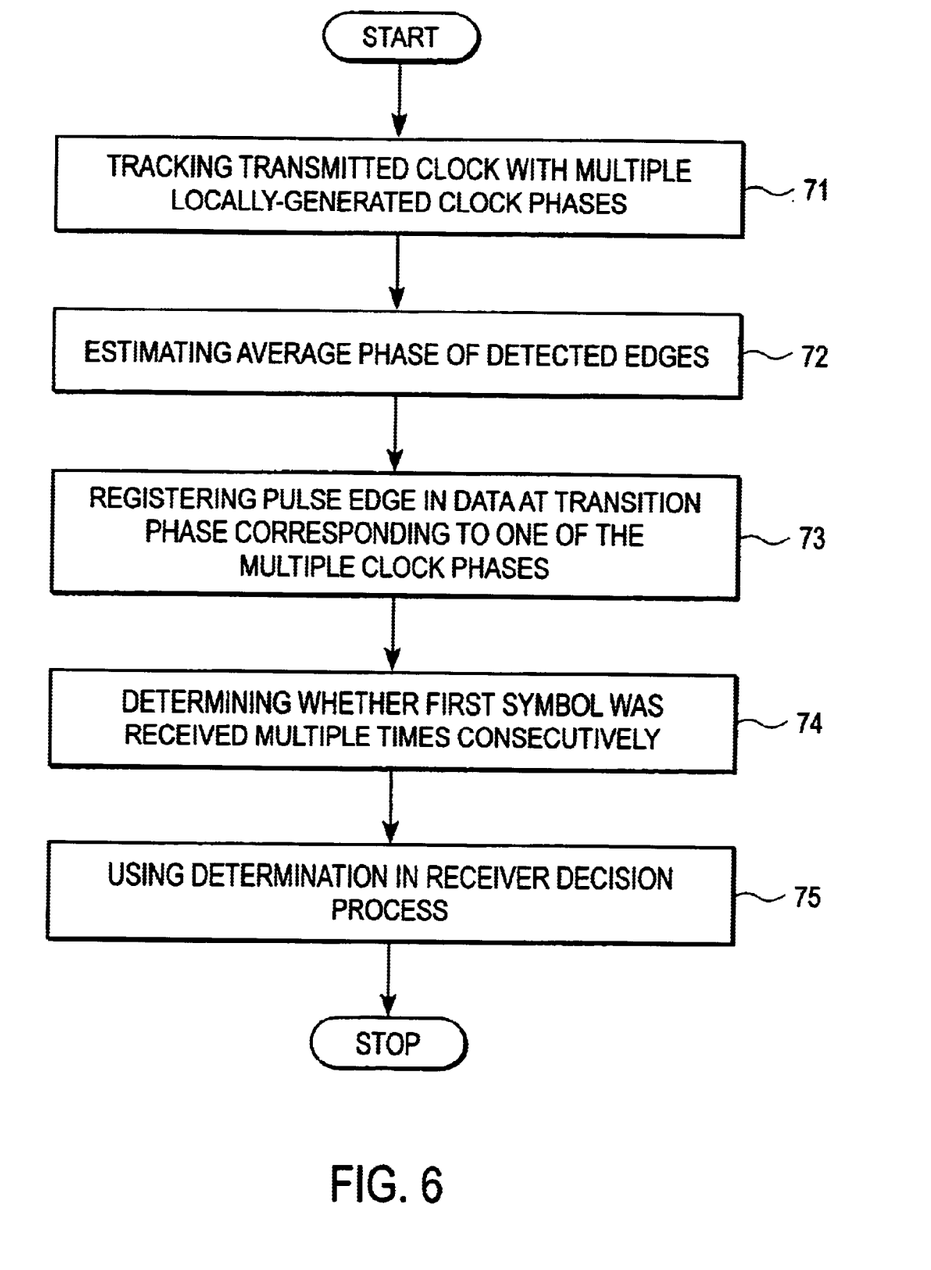
FIG. 6 depicts an exemplary embodiment of the using step in the embodiment of FIG. 7 according to another aspect of the invention.

Turning to FIG. 6, and as will be described in more detail, the receiver tracks a transmitted clock using multiple locally-generated clock phases (step 71). The receiver then estimates an average phase of the previously detected edges (step 72) and registers a pulse edge in the received stream of data at a transition phase corresponding to one of the locally-generated clock phases (step 73). Next, the receiver determines whether a first symbol was received multiple times consecutively prior to the detected pulse edge (step 74) and uses this determination of whether the first symbol was received multiple times consecutively in a receiver decision process (step 75).

The transmitter, receiver and/or transceiver functions above may be performed using software. As such, these instructions may be encoded on computer-readable media and subsequently executed by a processor. Any computer readable media may suffice, such as magnetic disks, optical disks, CD-ROMs, flash memory, EEPROMs, EPROMs, bubble memory, etc., to name only a few examples.

Receiver Description

Figure 2:
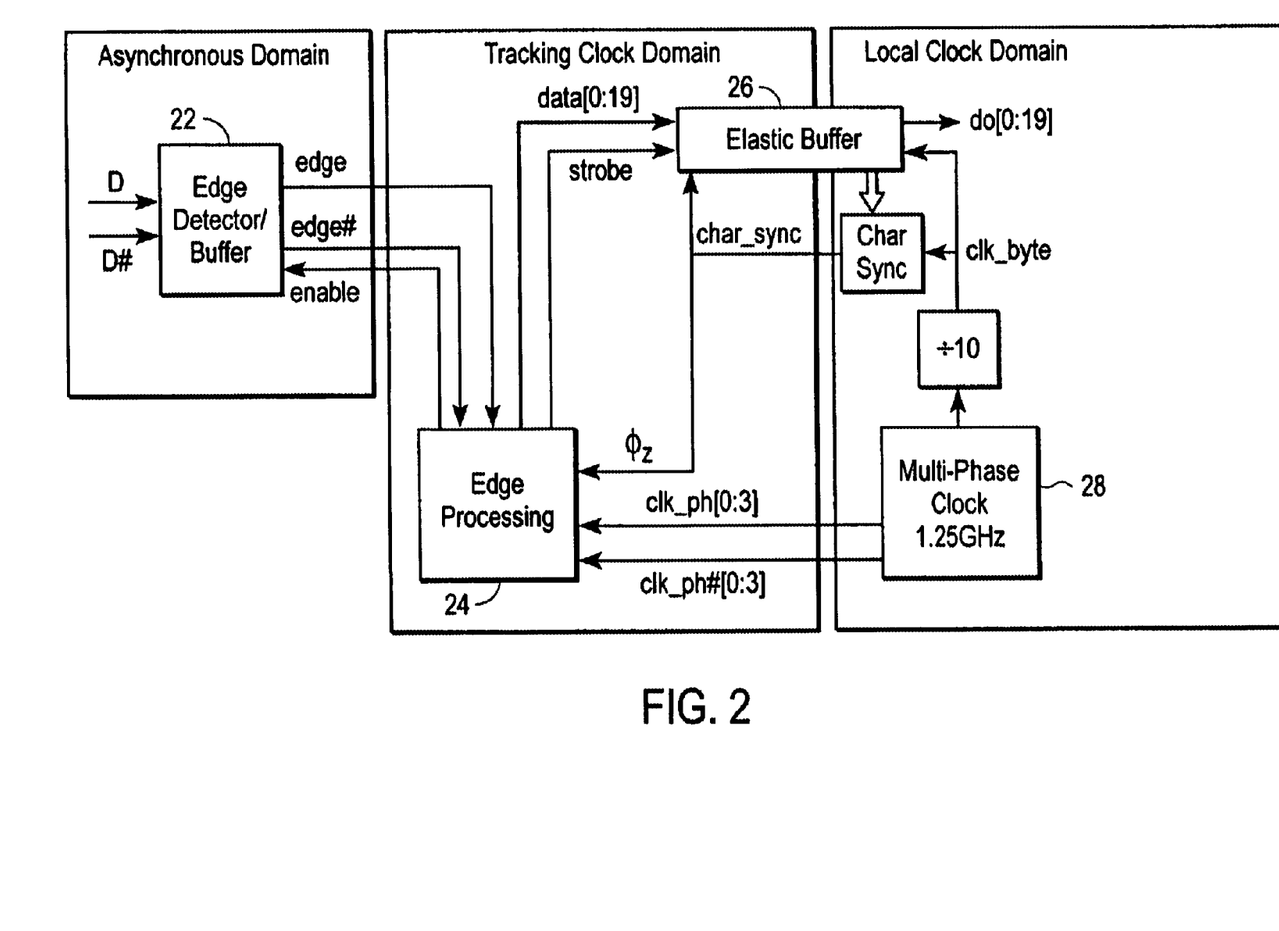
FIG. 2 depicts an exemplary embodiment of an edge-based receiver implementing digital equalization according to the invention.

The receiver employs a multi-phase clock generator that runs plesiochronously with respect to the transmit clock. A frequency difference between the two clock bases is specified to be less than a few hundreds parts per millions. The receiver functionality is divided into three main sections, i.e., an edge detector section, an edge processing section and an elastic buffer section. A high-level block diagram of this illustrative structure is shown in FIG. 2, which depicts edge buffer 22, edge processing section 24, and multi-phase clock generator 28.

Essentially, edge buffer 22 receives the coded transmission signal, which, in the illustrative communication system depicted in FIG. 1, is a differentially encoded signal. The edge signals produced by edge buffer 22 are forwarded to edge processor 24 upon receipt of an enable signal from edge processor 24. The edge processor 24 sends the data and a recovered clock phase $\phi_z$ to elastic buffer 26, out of which the data is clocked. Multi-phase clock 28 provides references to edge processor 24 for use in determining the recovered clock phase $\phi_z$. In accordance with an illustrative embodiment of the invention, and in a manner to be described in greater detail later, data history accumulated over a number of preceding, consecutive bit periods by the elastic buffer 26 is used to assign each pulse edge or transition, as it is detected, to either a current or a subsequent bit period.

A receiver constructed in accordance with an illustrative embodiment of the invention operates by detecting pulse edges or transitions, also referred to as "zero crossings", that occur in the input transmitted waveform or signal. As used herein, the term "zero crossings" or edges is used to refer to the start of a new symbol or bit, such as the time instances when two differential input signals cross each other. For a bit encoded using only one signal, the edges or zero crossings refer to the start of the symbol, such as the rising or falling edge of a pulse or turning on and off of a light source. Therefore, an edge or zero crossing signals a change in the transmitted bit as well as the absence of any data changes since the last edge.

The invention, through application of observed phase noise behavior across transmission lines, avoids the penalty of quantization jitter in systems, such as the illustrative differential encoding/decoding system described above, using a digital equalization technique. This digital equalization is performed, in accordance with the illustrative embodiment, by the edge processor 24, in a manner that will now be described.

Digital Equalization

Figure 3:
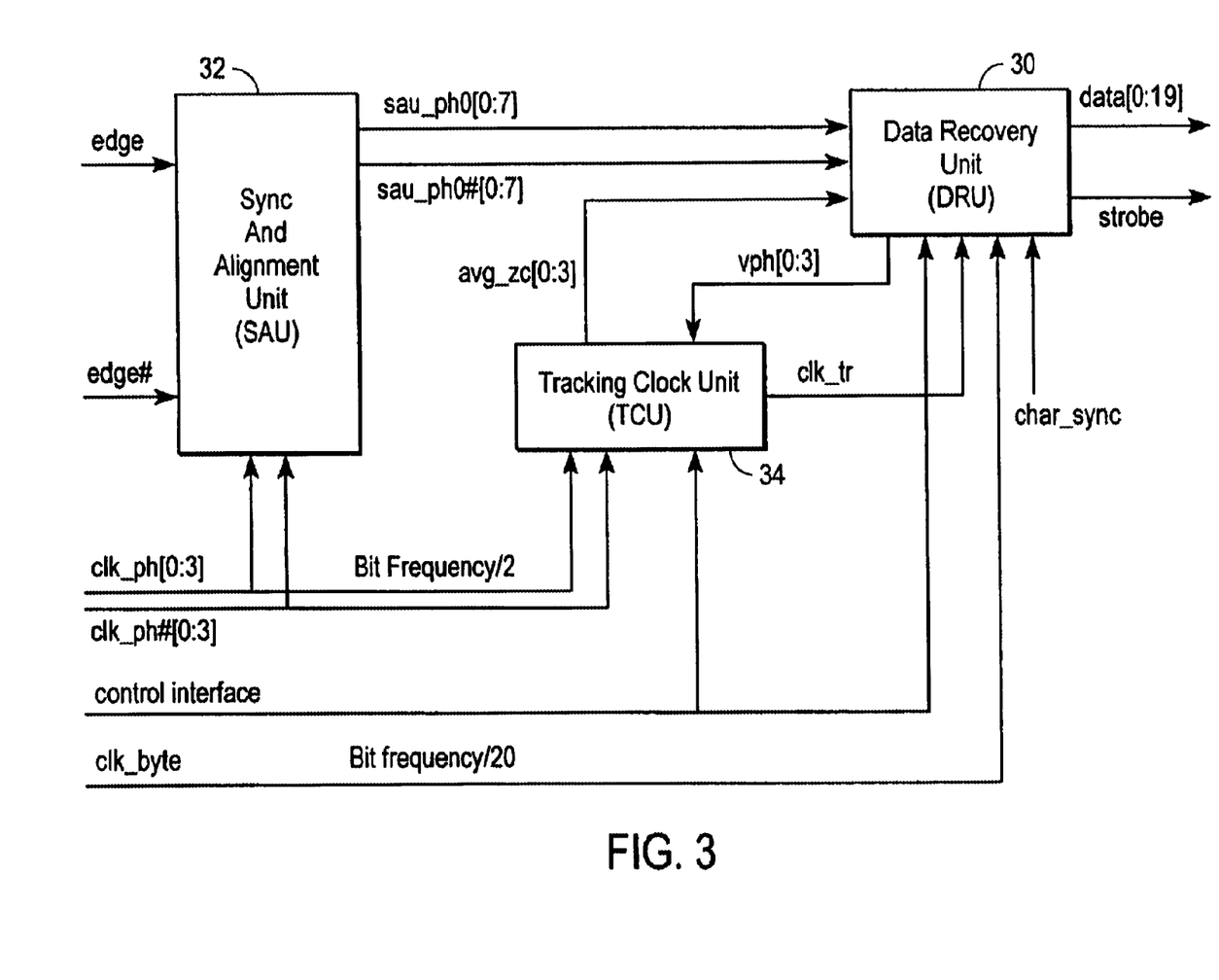
FIG. 3 depicts an exemplary embodiment of an edge processor, which forms part of the exemplary edge-based receiver of FIG. 2 and performs digital equalization to compensate for deterministic jitter of data in a received data signal.

As exemplified by an illustrative embodiment of the invention depicted in FIG. 3, digital equalization is facilitated by a data recovery unit 30 which forms a part of the edge processing unit 24. The purpose of data recovery unit 30 is to establish the final data output, by using sampled information received from a synchronizer and alignment unit 32, and an estimated mean zero crossing phase provided by tracking clock unit 34. In this process, the data recovery unit will remove the deterministic jitter associated with the edges, thereby relaxing the timing margins at the receiver. The samples received indicate the received edges synchronized to a multi-phase local clock. In effect, the multiple phases are used to bin the edge instances (time of occurrence) into several time intervals.

The data recovery unit uses the recovered data history to subtract the deterministic jitter associated with the edges. In order to subtract out the deterministic jitter (DJ) component, it is first necessary to estimate the composition of random jitter (RJ) and deterministic jitter seen at the input to the synchronizers. For purposes of illustration, it is sufficient to estimate the worst-case jitter seen at the input to the synchronizer to account for the jitter added by the front-end of the receiver. In the discussion that follows, exemplary jitter estimates and associated assumptions are discussed, followed by a description of an illustrative decision mechanism which may be employed to carry out the objectives of the invention.

Table 1 shows the jitter budget used in an exemplary embodiment of a communication system at an illustrative data rate of 2.5 Gb/s, and indicates a 0.35 unit interval (UI) eye opening at the receiver circuit input.

TABLE 1

| | Interconnect Budget for 2.5 Gbps Operation. | | |
|---|---|---|---|
| | DJ (UI) pk-pk | RJ (UI) pk-pk | Total (UI) pk-pk |
| Transmitter | 0.17 | 0.18 | 0.35 |
| Channel | 0.24 | 0.06 | 0.30 |
| Total | 0.41 | 0.24 | 0.65 |

The exemplary receiver is configured to work with an eye opening of 0.15 UI at the input to the synchronizers, at 2.5 Gbps. For purposes of the illustrative communication system depicted in FIG. 1, it is appropriate to consider that the receiver produces the same random jitter as the transmitter, i.e., 0.18 UI since the dominant random jitter component is presumed to be the phase locked loop (PLL), an element common to both transmitter and receiver. Deterministic jitter (DJ) of 0.02 UI is allocated to the receiver, leaving an eye opening of 0.15 UI. For purposes of analyzing the timing requirements, it is convenient to allocate all the received jitter components to the transmitter side, and assume zero jitter in the receiver. This approach will yield the following jitter numbers at the input to the synchronizer.

Total RJ seen at the synchronizer inputs=0.18 UI+0.18 UI+0.06 UI=0.42 UI
Total DJ seen at the synchronizer inputs=1.00 UI−0.15 UI−0.42 UI=0.43 UI

TABLE 2

| Jitter Budget at Input to Synchronizers for 2.5 Gbps Operation. | | | |
|---|---|---|---|
| | DJ (UI) pk-pk | RJ (UI) pk-pk | Total (UI) pk-pk |
| Input to the synchronizers | 0.43 | 0.42 | 0.85 |
| Receiver margin | | | 0.15 |

The total DJ at a given bit time is related to the history of the received data. This leads to the assumption that the worst case DJ of 0.43 UI seen at the synchronizers corresponds to a lone transition ('000001' or '111110') or a trailing edge of a lone pulse ('0000010' or '1111101').

In order to remove the deterministic jitter, it is proposed to quantify the deterministic jitter by looking at the data history. Here again, for ease of explanation, analysis continues on the basis of one-sided jitter values, from peak to peak quantities, in order to quantify the data dependent effects. For purposes of illustrative application of the underlying inventive principles to an exemplary receiver, it is assumed that deterministic jitter increases linearly with the number of consecutive symbols. While a more accurate model may be obtained by using specific characteristics of the actual channel, the foregoing generalization is sufficient for illustrative purposes. While it might further be noted that deterministic jitter also depends upon the cable length, such effects may be ignored since the analysis here proceeds on a worst case basis. It suffices to say that shorter cables will produce larger eye openings, and hence a higher signal to noise ratio.

TABLE 3

Magnitude of the DJ with Number of Consecutive Symbols

| # consecutive symbols | DJ (UI) one-sided |
|---|---|
| 5 | 0.22 |
| 4 | 0.16 |
| 3 | 0.11 |
| 2 | 0.06 |
| 0 | 0 |

Figure 4:
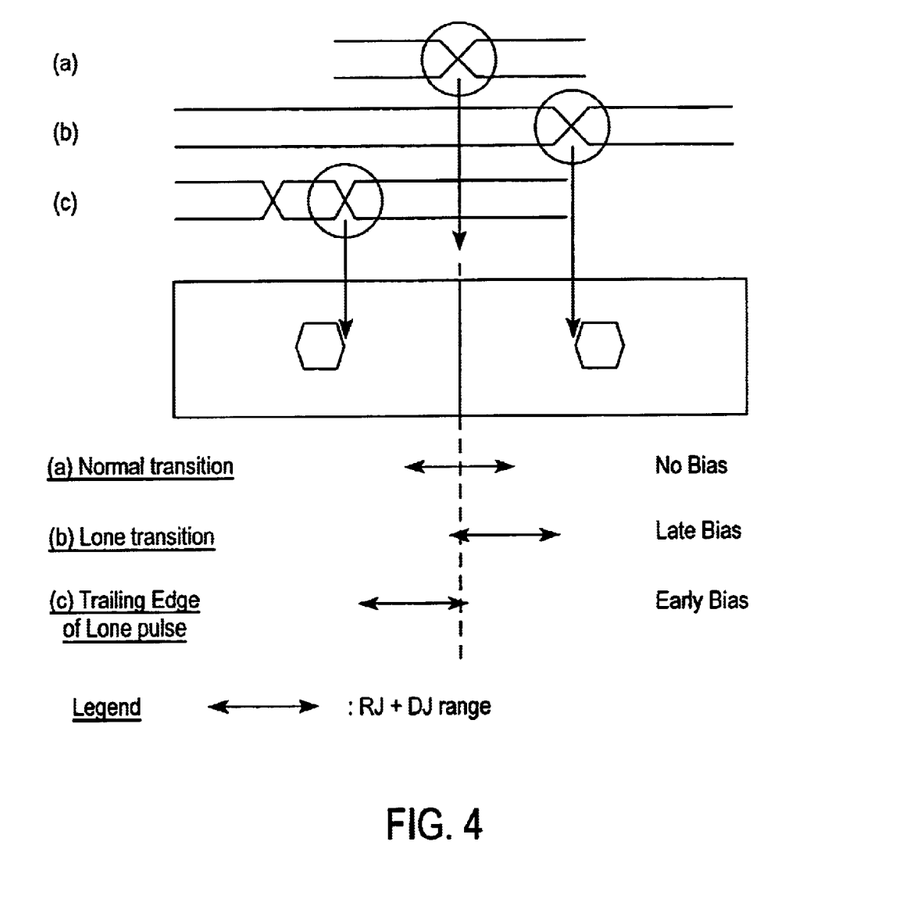
FIG. 4 depicts the bias introduced in the received signal by deterministic jitter.

The amount of deterministic jitter present in the edges tends to move them in opposite directions depending on the history of the data. If the current edge corresponds to a lone transition, the deterministic jitter always tends to delay it in time, i.e., late edge. On the other hand, if the current edge corresponds to the trailing edge of a lone pulse, then deterministic jitter has the opposite effect, advancing the edge in time, i.e., early edge. The bias introduced by the deterministic jitter is shown in FIG. 4. By quantifying the deterministic effects of the lone transition, trailing edge of the lone pulse and their friends (the patterns '00001', '0001', '001' and their inversions are considered to be friends of the lone transition, and the patterns '000010', '00010', '0010' and their inversions are considered to be "friends" of the lone pulse), it is possible to effectively remove deterministic jitter from the samples.

The above reasoning can be further extended by considering the friends of the lone transitions and the trailing edge of the lone pulse. The edges, which are similar to the lone transition and the trailing edge of the lone pulse, i.e., their friends, have similar effects on the transition, at a lesser magnitude. For example, the pattern '00001' will have considerable deterministic jitter to delay the transition. This is also shown in FIG. 4.

Decision Mechanism

In accordance with an illustrative embodiment of a receiver, the decision mechanism employs three pieces of information in order to recover the data.

1. Currently selected mean zero-crossing phase $\Phi_z$.
2. The clock phase $\Phi_t$ (transition phase) which registered the transition, if any.
3. The history of the recovered data.

Figure 5:
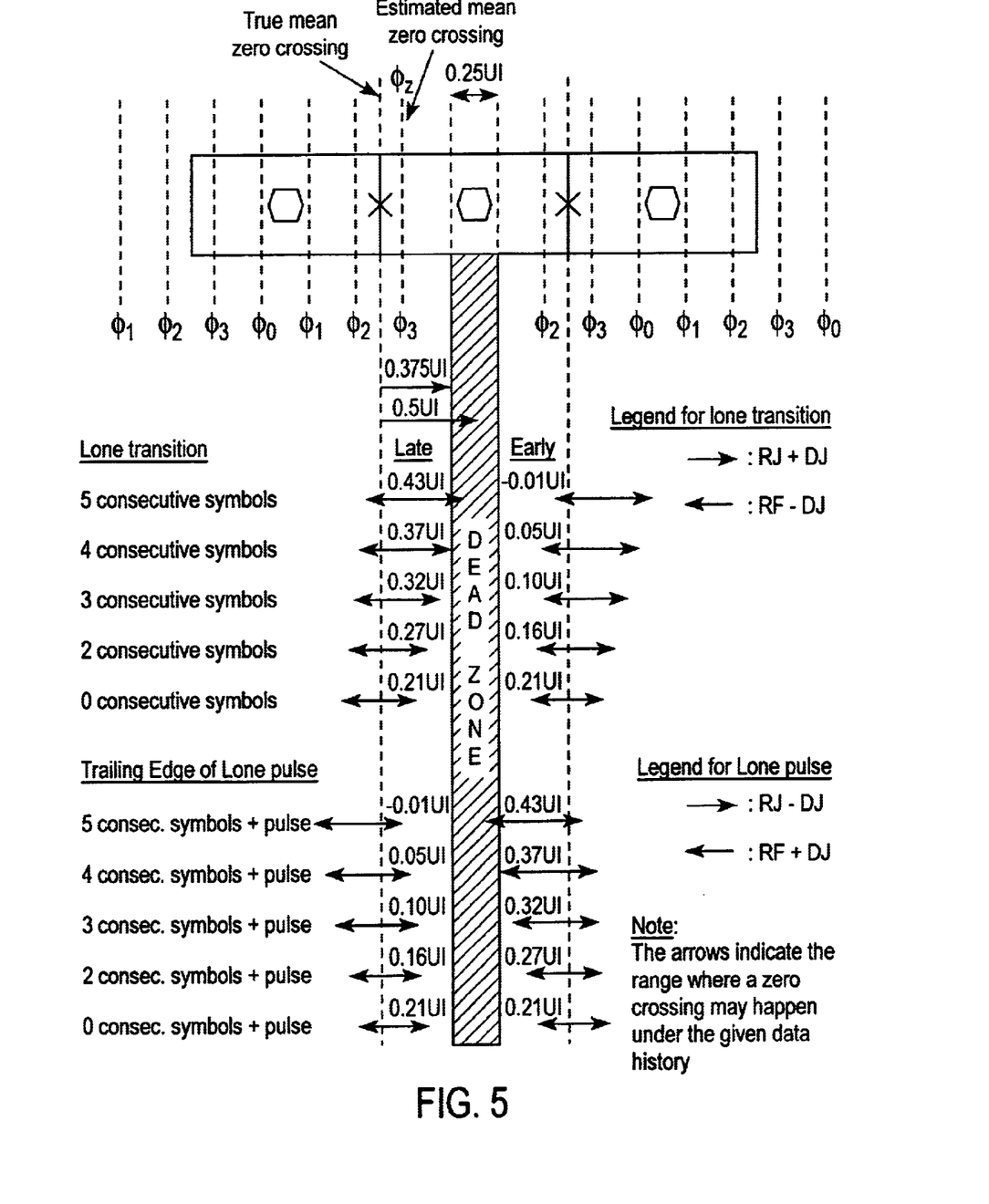
FIG. 5 depicts the possible regions where a transition can be registered and the associated decision, for an illustrative 2.5 Gbps receiver implementation employing four clock phases per bit time.

Data recovery unit (DRU) 30 assumes the received bit periods to start at $\Phi_z$. If a transition is registered with $\Phi_t$, then data recovery unit 30 must toggle the data output, in order to reflect the transition. However, it is first necessary to determine the bit period to which the transition belongs. Depending on t, there are two possibilities. It may belong to the current bit period or the next bit period. FIG. 5 shows the possible regions where a transition can be registered and the associated decision, for an illustrative 2.5 Gbps implementation with an exemplary four clock phases per bit time.

According to FIG. 5, the current mean zero crossing phase $\Phi_z=\Phi_3$. There are three regions (or three possible values for the transition phase $\Phi_t$) where the decision is fairly straightforward. Since there is a guaranteed eye opening at the center, it can be concluded that any transition registered to the left of the eye opening correspond to the current bit period and all transitions to the right of the eye correspond to the next bit period.

In the example, a transition registered with $\Phi_3$ or $\Phi_0$ indicates that it belongs to the current bit period, whereas a transition registered with $\Phi_2$ indicates that it belongs to the next bit period. However, if a transition is registered with $\Phi_1$, the decision is ambiguous. That is, it might either correspond to a late transition from the current bit time or to an early transition from the next bit time. So long as the eye opening is smaller than the spacing between two adjacent clock phases, this ambiguity will exist. The region where the decision is ambiguous shall be referred to herein as the "dead zone."

It is possible to adopt several methods to avoid the decision ambiguity when a transition happens in the dead zone. One possible method is to increase the number of clock phases per bit lime. However, it is difficult to generate and route high-speed, multi-phase clocks with low jitter. Therefore, this option may not be suitable beyond a certain number of clock phases, and also does not scale with increasing jitter.

Alternatively, the history of the data may be used to resolve the ambiguity, effectively removing the deterministic jitter associated with the transition.

A third method is to separate out the transitions into two categories, i.e., positive and negative zero crossings, and assign a polarity to the transition. By distinguishing between the polarities, an extra rule can be added to the decision process, i.e., consecutive transitions must always have different polarities. In accordance with an illustrative embodiment of receiver, both the second and third approaches are employed.

First, the deterministic jitter removal is achieved using data history. With continued reference to FIG. 5, the transition regions shown therein depict a gap between a late edge of the current bit period and an early edge belonging to the next bit period. It should be noted that the data is based on the jitter specifications and the assumption that deterministic jitter scales linearly. The illustrative data implies that only two extreme transition cases may fall in the dead zone, i.e., lone transition with five consecutive symbols and the trailing edge of the lone pulse with five consecutive symbols. These two cases can be easily distinguished due to the fact that deterministic jitter gets added in opposite directions.

Also notice that the detection of the trailing edge of the lone pulse is easier then the detection of the lone transition, in the sense that we only need to detect a change in the last two bits. So the information obtained from deterministic jitter removal method may be simplified as follows: (1) if the last two bits are different AND there is a dead zone transition, the registered transition or edge is assigned to the next bit period and (2) if the last two bits are equal AND there is a dead zone transition, the registered transition or edge is assigned to the current bit period.

The decision can be further enhanced by including the mean zero crossing location information provided by tracking clock unit 34 (FIG. 3). Such information provides greater accuracy in assigning the transition ranges established in the diagram, by reducing the error between the true mean zero crossing and the estimated mean zero crossing. The worst-case error in the phase estimation assumed in connection with the illustrative representation of FIG. 5 is +/−0.0625 UI.

Previous digital implementations of equalization require taking samples at a rate considerably faster than the actual signal. If the signal is produced anywhere near the physical signaling limits of the silicon, analog circuitry must be used to recover the data. Analog circuitry is large, power consuming and does not replicate well. Receivers embodying the invention can recover data at the high rate of speed normally associated with analog circuitry while taking advantage of the power savings, silicon substrate area savings and design/algorithmic repeatability.

The invention can be illustrated through a truth table and a circuit implementation. In the truth table, the data is extracted from four samples during any given bit period (UI). Digital averaging might further improve the results obtained by centering all marginal (or dead zone) transitions to the center of each sample window. Again, these samples are based on several observations about the nature of phase distortions (or noise) across a transmission line, that is, deterministic jitter distributes in a linear fashion per bit order and bit patterns bias average zero crossings late (dead zone transitions early).

FIG. 6 depicts an exemplary embodiment of a method according to one aspect of the invention. According to this embodiment, the transmitted clock is tracked with multiple locally-generated clock phases (step 71). The average phase of the detected edges is estimated (step 72). A pulse edge in the data stream is registered at the transition phase corresponding to one of the multiple locally-generated clock phases (step 73). Next, it is determined whether the first symbol was received multiple times consecutively (step 74). This determination is then used in the receiver decision process (step 75).

Figure 7:
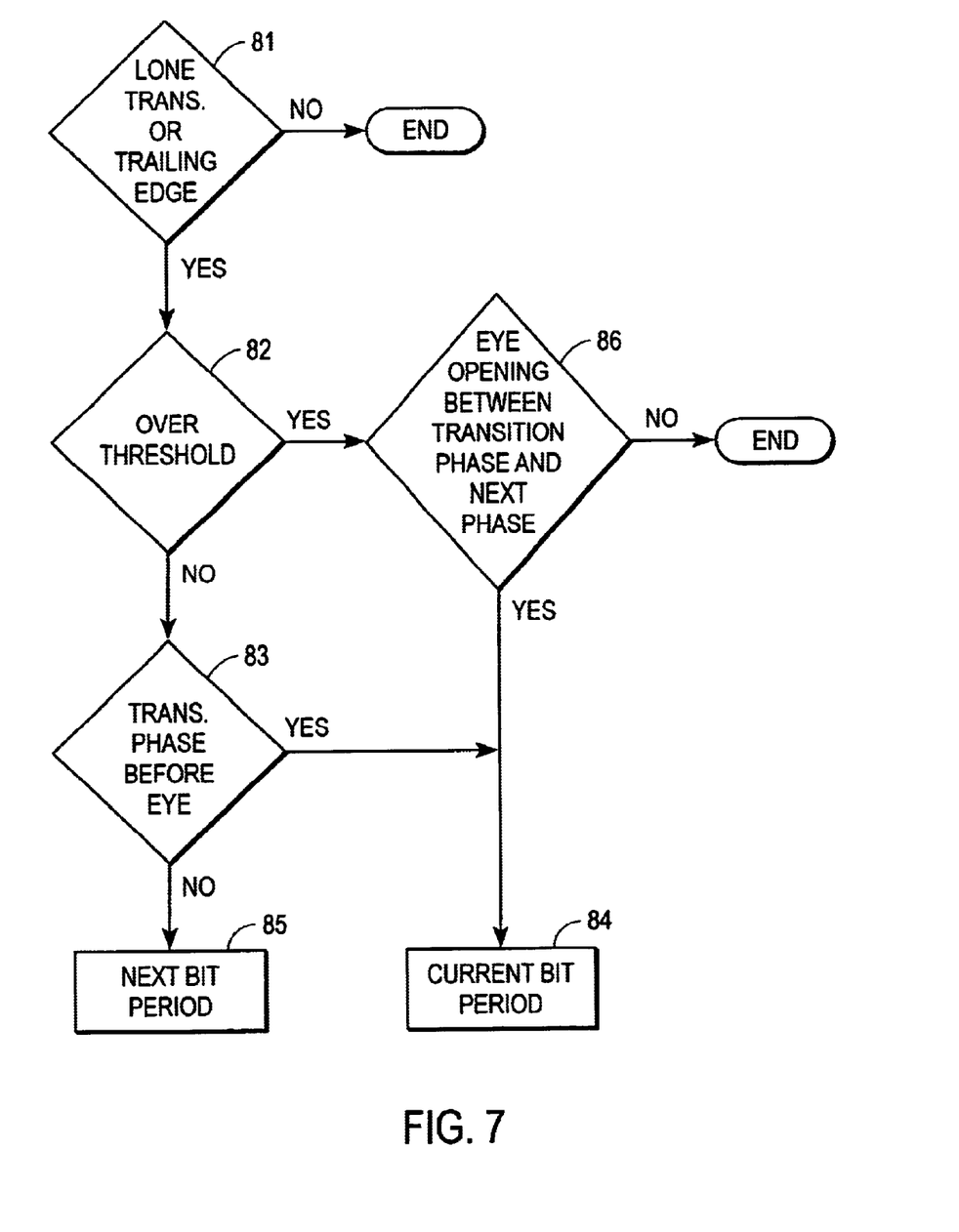
FIG. 7 depicts an exemplary embodiment of the final two steps of the embodiment of FIG. 6 according to another aspect of the invention.

Turning to FIG. 7, an exemplary embodiment of alternative embodiments of the interaction of the determining step 74 and the using step 75. In one embodiment, the process determines whether the registered pulse from step 73 is a lone transition (step 81). If not, then the process ends without a decision. If the registered pulse is a lone transition, then the process determines whether the lone transition has been preceded by a number of symbols above a predetermined threshold (step 82). If the threshold has not been exceeded, then the process determines whether the transition occurs before the eye opening in the received data signal (step 83). If so, the process determines that the registered pulse is associated with the current bit period (step 84). If not, the process determines that the registered pulse is associated with the next bit period (step 85). Returning back to step 82, if the threshold of consecutive symbols has been exceeded, the process determines whether the eye opening lies between the transition phase and the next phase (step 86). If so, the registered pulse edge is associated with the current bit period (step 84). If the eye opening does not lie between the transition phase and the next phase, then the registered pulse may belong to the next bit period or not.

The above process can be repeated based on determining whether the registered pulse is a trailing edge or not (step 81). The remaining steps (82–86) repeat as shown.

Although various embodiments are specifically illustrated and described herein, it will be appreciated that modifications and variations of the invention are covered by the above teachings and within the purview of the appended claims without departing from the spirit and intended scope of the invention. For example, while several of the embodiments depict the use of four clock phases, other numbers (n) of clock phases will suffice, such as only two or more than four. In addition, while some of the above embodiments use a counter and a maximizer to determine a moving average of the phase of the edges, any technique for calculating the moving average will suffice. Furthermore, while some of the above embodiments use differential coding, any coding scheme, or no coding, will suffice. These examples should not be interpreted to limit the modifications and variations of the invention covered by the claims but are merely illustrative of possible variations.

What is claimed is:

1. A method of recovering data from a modulated data signal, comprising:

tracking a transmitted clock with a plurality of locally-generated clock phases;

estimating an average phase of one or more detected edges in a data stream;

registering a pulse edge in the data stream, at a transition phase corresponding to one of said plurality of locally-generated clock phases;

determining whether a first symbol was received multiple times consecutively prior to the detected pulse edge; and using the determination of whether said first symbol was received multiple times consecutively in a receiver decision process.

2. The method according to claim 1, wherein said determining includes determining whether the pulse edge registered during said registering step corresponds to a lone transition from a consecutive sequence of said first symbol to a second symbol.

3. The method according to claim 2, further comprising establishing a threshold number of consecutive symbols to precede any said lone transition.

4. The method according to claim 3, wherein, if the registered pulse edge is determined to correspond to said lone transition, said using comprises associating said registered pulse edge with a current bit period when a number of consecutively received symbols is below said threshold number of consecutive symbols and said transition phase precedes an eye opening formed in the data steam.

5. The method according to claim 3, wherein, if the registered pulse edge is determined to correspond to said lone transition, said using comprises associating said registered pulse edge with a subsequent bit period when a number of consecutively received symbols is below said threshold number of consecutive symbols and an eye opening formed in the data streams precedes said transition phase.

6. The method according to claim 3, wherein if the registered pulse edge is determined to correspond to said lone transition, said using comprises associating said registered pulse edge with a current bit period when a number of consecutively received symbols exceeds said threshold number of consecutive symbols and an eye opening formed in the data streams is between said transition phase and an immediately subsequent clock phase.

7. The method according to claim 1, wherein said determining includes determining whether the pulse edge registered during said registering step corresponds to a trailing edge of a single second symbol between a consecutive sequence of said first symbol and another occurrence of said first symbol.

8. The method according to claim 7, further comprising establishing a threshold number of consecutive symbols to precede said single second symbol.

9. The method according to claim 8, wherein, if the registered pulse edge is determined to correspond to said trailing edge of said single second symbol, said using comprises associating said registered pulse edge with a current bit period when a number of consecutively received symbols is below said threshold number of consecutive symbols and said transition phase precedes an eye opening formed in the data stream.

10. The method according to claim 8, wherein, if the registered pulse edge is determined to correspond to said trailing edge of said single second symbol, said using comprises associating said registered pulse edge with a subsequent bit period when a number of consecutively received symbols is below said threshold number of consecutive symbols and an eye opening formed in the data stream precedes the transition phase.

11. The method according to claim 8, wherein if the registered pulse edge is determined to correspond to said trailing edge of said single second symbol, said using comprises associating said registered pulse edge with a subsequent bit period when a number of consecutively received symbols exceeds said threshold number of consecutive symbols and an eye opening formed in the data streams is between said transition phase and an immediately subsequent clock phase.

12. An edge processor adapted to determine an average phase of detected edges and output a data signal and said average phase, said edge processor comprising:
   a synchronizer operative to compare a detected edge signal to a plurality of locally generated clock phases, select a clock phase among the plurality of locally-generated clock phases closest to an edge signal, and output a phase voting signal to indicate a transition clock phase closest to the detected edge signal; and
   a data recovery unit operative to track whether a first symbol was received multiple times consecutively prior to the detected edge and to assign the detected edge to one of a current bit period and a subsequent bit period based upon said transition clock phase and a number of times said first symbol was consecutively received prior to a transition to a second symbol.

13. The edge processor according to claim 12, further including a phase picking logic circuit coupled to the synchronizer to determine said average phase based on the phase voting signal received from the synchronizer.

14. A computer system including a plurality of modular components communicating with each other, each of the modular components employing a receiving method to receive a modulated data signal from another modular component, said receiving method comprising:
   tracking a transmitted clock with a plurality of locally-generated clock phases;
   estimating an average phase of one or more detected edges in a data stream;
   registering a pulse edge in the data stream, at a transition phase corresponding to one of said plurality of locally-generated clock phases, to detect the pulse edge;
   determining whether a first symbol was received multiple times consecutively prior to the detected pulse edge; and
   using the determination of whether said first symbol was received multiple times consecutively in a receiver decision process.

15. The computer system according to claim 14, wherein said determining includes determining whether the pulse edge registered during said registering step corresponds to a lone transition from a consecutive sequence of said first symbol to a second symbol.

16. The computer system according to claim 15, wherein said receiving method further comprises establishing a threshold number of consecutive symbols to precede any said lone transition.

17. The computer system according to claim 16, wherein, if the registered pulse edge is determined to correspond to said lone transition, said using comprises associating said registered pulse edge with a current bit period when a number of consecutively received symbols is below said threshold number of consecutive symbols and said transition phase precedes an eye opening formed in the data stream.

18. The computer system according to claim 16, wherein, if the registered pulse edge is determined to correspond to said lone transition, said using comprises associating said detected pulse edge with a subsequent bit period when a number of consecutively received symbols is below said threshold number of consecutive symbols and said transition phase is preceded by an eye opening formed in the data streams.

19. The computer system according to claim 16, wherein if the registered pulse edge is determined to correspond to said lone transition, said using comprises associating said detected pulse edge with a current bit period when a number of consecutively received symbols exceeds said threshold number of consecutive symbols and an eye opening formed in the received data signal is between said transition phase and an immediately subsequent clock phase.

20. The computer system according to claim 14, wherein said determining includes determining whether the pulse edge registered during said registering step corresponds to a trailing edge of a single second symbol between a consecutive sequence of said first symbol and another occurrence of said first symbol.

21. The computer system according to claim 20, wherein said receiving method further comprises establishing a threshold number of consecutive symbols to precede said single second symbol.

22. The computer system according to claim 21, wherein, if the registered pulse edge is determined to correspond to said trailing edge of said single second symbol, said using comprises associating said registered pulse edge with a current bit period when a number of consecutively received symbols is below said threshold number of consecutive symbols and said transition phase precedes an eye opening formed in the data stream.

23. The computer system method according to claim 21, wherein, if the registered pulse edge is determined to correspond to said trailing edge of said single second symbol, said using comprises associating said registered pulse edge with a subsequent bit period when a number of consecutively received symbols is below said threshold number of consecutive symbols and an eye opening formed in the data stream precedes the transition phase.

24. The computer system according to claim 21, wherein if the registered pulse edge is determined to correspond to said trailing edge of said single second symbol, said using comprises associating said registered pulse edge with a subsequent bit period when a number of consecutively received symbols exceeds said threshold number of consecutive symbols and an eye opening formed in the received data signal is between said transition phase and an immediately subsequent clock phase.

25. A computer readable media having instructions encoded thereon causing a processor to:
   track a transmitted clock with a plurality of locally-generated clock phases;

estimate an average phase of one or more detected edges in a data stream;

register a pulse edge in the data stream, at a transition phase corresponding to one of said plurality of locally-generated clock phases, to detect the pulse edge;

determine whether a first symbol was received multiple times consecutively prior to the detected pulse edge; and use the determination of whether said first symbol was received multiple times consecutively in a receiver decision process.

26. A computer system comprising:

a plurality of components communicating with each other, each of the components including a receiver to receive a modulated data signal from another component, said receiver further to:

track a transmitted clock with a plurality of locally-generated clock phases;

estimate an average phase of one or more detected edges in the modulated data signal;

register a pulse edge in the modulated data signal, at a transition phase corresponding to one of said plurality of locally-generated clock phases, to detect the pulse edge;

determine whether a first symbol was received multiple times consecutively prior to the detected pulse edge; and use the determination of whether said first symbol was received multiple times consecutively in a receiver decision process.

* * * * *